Patented Feb. 18, 1936

2,031,356

UNITED STATES PATENT OFFICE 2,031,356

PROCESS FOR DYEING OR COLORING CELLULOSE ESTERS AND CELLULOSE ETHERS

Franz Ackermann, Binningen, near Basel, Switzerland, assignor to the firm Society of Chemical Industry in Basle, Basel, Switzerland No Drawing. Original application May 16, 1932, Serial No. 611,758. Divided and this application April 2, 1935, Serial No. 14,375. In Switzerland May 23, 1931

8 Claims. (Cl. 8—5)

It is known that compounds which contain a reactive methylene group, such as pyrazolones, dioxyquinolines, barbituric acids, sulfazones, methyl indols, diketohydrindene, quinaldines, methylimidazols, acetylacetone, benzoylacetone, dihydroresorcinols, benzylcyanide, cyanacetic acid, cyanacetic esters, cyanacetophenone, rhodanines and the like are capable of reacting with cyclic compounds selected from a group consisting of aromatic aldehydes and aromatic nitroso compounds and containing reactive oxygen atoms, with the formation of colored products. The reaction leading to such products occurs quite generally according to the following scheme:—

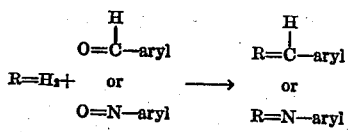

wherein $H_2$ represents the two hydrogen atoms of the methylene group capable of reaction. In the products of the above mentioned formula the double linkage, which does not belong to a quinoid system, plays the part of the main chromophore.

This invention is based on the discovery that these products, which quite generally correspond to the general formula

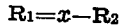

wherein $R_1$ stands for any residue of a compound containing a reactive methylene group, $x$ for CH or N, and $R_2$ for the residue of a compound containing the reactive oxygen atom, are very well suited for dyeing, printing or coloring cellulose esters and cellulose ethers, such as acetate silk or nitro-cellulose varnishes. The products dye these materials various shades which may be distinguished by their purity in combination with other good properties of fastness.

Among the numerous compounds which here come into consideration, those are particularly valuable which contain a basic group such as an $NH_2$ group or an $N(alkyl)_2$ group. Among these compounds those in turn are especially valuable in which the residue $R_2$ above defined is the residue of an aromatic amino aldehyde. Nevertheless it will be clear from the description and from the table that useful results are obtained with practically any cyclic aldehyde, ketone or nitroso compound.

The following examples illustrate the invention, the parts being by weight:—

Example 1

0.5 part of the condensation product from 1-(2'-chloro)-phenyl-3-methyl-5-pyrazolone and paradimethylaminobenzaldehyde (which may advantageously be obtained by heating the components in dilute hydrochloric acid) is brought into a fine state of sub-division, for example by dissolving it in alcohol, pouring the solution into water, filtering and triturating the residue with sulfite cellulose waste liquor or Turkey red oil, and is then introduced into about 3000 parts of water in which have been dissolved 6 parts of soap. 100 parts of acetate silk are entered at about 40° C., the temperature is raised to 75–80° C. and dyeing is continued for ½ hour to 1 hour at this temperature. The material is then rinsed, brightened and dried in the usual manner. The acetate silk is dyed vivid strongly reddish yellow shades.

If the condensation product used in this example is used as a yellow component in the production of mixed shades, for example grey, the dyeings obtained are not phototropic.

Example 2

0.5 part of the condensation product from cyanacetic acid ethyl ester and paradimethylaminobenzaldehyde, which has been brought into a state of fine sub-division, for example by dissolving it in alcohol, pouring into water, filtering and triturating the residue with sulfite cellulose waste liquor or Turkey red oil, is introduced into about 3000 parts of water in which 6 parts of soap have been dissolved. 100 parts of acetate silk are entered at about 40° C., the temperature is raised to 75–80° C. and dyeing is continued for ½ to 1 hour at this temperature. The material is then rinsed, brightened and dried in the usual manner. The acetate silk is dyed vivid pure greenish yellow shades.

Similar dyeings are obtained by using instead of cyanacetic acid ethyl ester another ester of cyanacetic acid, such as the methyl, isopropyl or butyl ester, and by using instead of para-dimethylaminobenzaldehyde, paradiethylamino-benzaldehyde or 2-chloro-4-dimethylaminobenzaldehyde.

Instead of dimethylaminobenzaldehyde there may obviously be used dipropyl-, or diamylaminobenzaldehyde. Monoalkylaminobenzaldehydes may also be used.

Example 3

An acetate silk fabric is printed with a printing color containing per litre 20 grams of the condensation product from cyanacetic acid and paradimethylaminobenzaldehyde (which may be obtained by saponifying the condensation product referred to in the first paragraph of Example 2), 40 grams of glycerine, 240 grams of water and 700 grams of a gum thickening consisting of 50 per cent. of gum arabic and 50 per cent. of water. The material is then dried, steamed for 1 hour under an over-pressure of ¼ atmosphere and finished in the usual manner. The printed portions of the fabric are dyed pure greenish yellow.

Example 4

5 parts of the dyestuff from cyanacetic acid and paradimethylaminobenzaldehyde are dissolved in 3000 parts of water with the aid of 2.5 parts of anhydrous sodium carbonate. 100 parts of acetate silk are dyed in the dye bath thus prepared for 1 hour at 40–75° C. with the addition of 6 parts of concentrated sulfuric acid and 10 parts of Glauber salt. The acetate silk is dyed a beautiful pure greenish yellow.

Acetate silk may be dyed in a similar manner by using instead of the sulfuric acid 8 parts of acetic acid of 84 per cent strength.

The manner of working described in this example is also suitable for those products whose salts are colored.

Example 5

The procedure is as described in the first paragraph of Example 1, with the exception that instead of the condensation product therein named there is used the condensation product from para-nitrosodimethylaniline and 1-phenyl-3-methyl-5-pyrazolone. The acetate silk is dyed a beautiful violet bordeaux.

The following table illustrates the shades which can be obtained by means of some of the condensation products used in the present invention.

| | Compound containing a reactive methylene group | Aldehyde or nitroso compound | Color on acetate silk or in a nitrocellulose varnish |
|---|---|---|---|
| 1 | Benzyl cyanide | Para-diethylaminobenzaldehyde | Yellow. |
| 2 | do | Para-dimethylaminobenzaldehyde | Do. |
| 3 | do | Para-nitrosodimethylaniline | Orange. |
| 4 | p-nitrobenzyl cyanide | Para-dimethylaminobenzaldehyde | Do. |
| 5 | do | Para-nitrosodimethylaniline | Red. |
| 6 | Diketohydrindene | Para-dimethylaminobenzaldehyde | Orange. |
| 7 | do | Para-nitrosodimethylaniline | Violet. |
| 8 | Nitromethane | Para-dimethylaminobenzaldehyde | Orange. |
| 9 | do | Ortho-chloro-para-dimethyl-amino-benzaldehyde | Do. |
| 10 | Malonitrile | Para-dimethylaminobenzaldehyde | Greenish-yellow. |
| 11 | do | Ortho-chloro-para-dimethyl-amino-benzaldehyde | Do. |
| 12 | do | Para-nitrosodimethylaniline | Orange. |
| 13 | Hydroxythionaphthene | Benzaldehyde | Yellow. |
| 14 | do | Nitrosodimethylaniline | Violet-red. |
| 15 | do | 2-chloro-4-dimethylamino-1-nitrosobenzene | Violet. |
| 16 | do | 2-hydroxy-4-dimethylamino-1-nitrosobenzene | Do. |
| 17 | do | Para-nitrobenzaldehyde | Yellow. |
| 18 | do | Ortho-chlorobenzaldehyde | Do. |
| 19 | do | Para-nitrobenzaldehyde | Do. |
| 20 | do | Furfurol | Do. |
| 21 | 6-amino-hydroxythionaphthene | Benzaldehyde | Orange. |
| 22 | 5-methylhydroxythionaphthene | Para-nitrosodimethylaniline | Red-violet. |
| 23 | 5-chloro-7-methyl-hydroxythionaphthene | do | Violet. |
| 24 | Dimethylaminobenzalacetone | Para-dimethylaminobenzaldehyde | Orange. |
| 25 | do | Ortho-chlorobenzaldehyde | Do. |
| 26 | do | Para-nitro-benzaldehyde | Do. |
| 27 | do | Cinnamaldehyde | Red-orange. |
| 28 | do | Para-nitrosodiethylaniline | Orange. |
| 29 | Cyanacetic acid ethyl ester | Terephthalaldehyde | Yellow. |
| 30 | do | Para-dimethylaminobenzaldehyde (after condensation with ammonia) | Do. |
| 31 | do | Para-dimethylaminobenzaldehyde (after condensation with ethanolamine) | Do. |
| 32 | do | Para-dimethlaminobenzaldehyde (after condensation with diethylamine) | Orange. |
| 33 | do | Para-dimethylaminobenzaldehyde (after condensation with monoethylamine) | Yellow. |
| 34 | Cyanacetic acid anilide | Para-dimethylaminobenzaldehyde | Do. |
| 35 | Cyanacetic acid monohydrazide | do | Do. |
| 36 | Cyanacetic acid-para-dimethlaminoanilide | do | Do. |
| 37 | Cyanacetic acid ethyl ester | Product of coupling diazotized para-aminobenzaldehyde and dimethylaniline. | Red. |
| 38 | 1-phenyl-3-methyl-5-pyrazolone | do | Do. |
| 39 | do | Benzaldehyde | Orange. |
| 40 | 1-phenyl-3-methyl-5-pyrazolone | Ortho-chlorobenzaldehyde | Do. |
| 41 | do | Piperonal | Do. |
| 42 | do | Cinnamaldehyde | Do. |
| 43 | do | Para-aminobenzaldehyde | Do. |
| 44 | 3-methyl-5-pyrazolone | Para-dimethylaminobenzaldehyde | Do. |
| 45 | 1-(meta-amino)-phenyl-3-methyl-5-pyrazolone | do | Do. |
| 46 | 1-(para-chloro)-phenyl-3-methyl-5-pyrazolone | Para-diethylaminobenzaldehyde | Do. |
| 47 | 1-(meta-amino)-phenyl-5-pyrazolone-3-carboxylic acid | Para-dimethylaminobenzaldehyde | Yellow-red. |
| 48 | 1-(ortho-chloro)-phenyl-3-methyl-5-pyrazolone | Product of coupling diazotized para-aminobenzaldehyde and dimethylaniline. | Do. |
| 49 | do | Product of coupling diazotized para-aminobenzaldehyde and aniline. | Orange. |
| 50 | 1-phenyl-5-pyrazolone-3-carboxylic acid ethyl ester | Benzaldehyde | Do. |
| 51 | do | Para-dimethylaminobenzaldehyde | Yellow-red. |
| 52 | 1-hydroxynaphthalene | do | Do. |
| 53 | Acetophenone | do | Yellow. |
| 54 | Methoxyacetophenone | do | Greenish-yellow. |
| 55 | Cyanacetophenone | do | Golden-yellow. |
| 56 | 2:4-diketotetrahydrothiazole | do | Greenish-yellow. |
| 57 | N-ethylrhodanine | 2:4-diaminobenzaldehyde | Orange. |
| 58 | Rhodanine | β-indolaldehyde | Yellow. |
| 59 | Barbituric acid | Para-dimethylaminobenzaldehyde | Rose. |
| 60 | Ethyl malonate | do | Yellow. |
| 61 | Ethyl acetoacetate | do | Do. |
| 62 | Acetoacetanilide | do | Do. |
| 63 | Acetoacetic acid-ortho-anisidide | do | Do. |
| 64 | Acetoacetic acid-para-dimethylaminoanilide | do | Do. |

| Compound containing a reactive methylene group | Aldehyde or nitroso compound | Color on acetate silk or in a nitrocellulose varnish |
|---|---|---|
| 65 2:4-dioxyquinoline | Para-dimethylaminobenzaldehyde | Yellow. |
| 66 Desoxybenzoin | Nitrosodiethylaniline | Do. |
| 67 6-(2:4-dinitro)-phenylaminomethylbenzimidazole | Para-dimethylaminobenzaldehyde | Do. |
| 68 Methylbenzimidazole | do | Do. |
| 69 α-methyl-indol | do | Do. |
| 70 2:3:3-trimethylindoleninium methyl chloride | do | Bright blue-red. |
| 71 6-methylquinaldine | do | Orange. |
| 72 para-chloro-α-methyl-indol | do | Violet. |
| 73 Pyruvic acid ethyl ester | do | Orange. |
| 74 2:5-dimethylpyrazine | Para-nitrosodimethylaniline | Yellow. |
| 75 Cyanacetic acid ethyl ester | Anthraquinone-1-amino-2-aldehyde | Red-yellow. |
| 76 Fluorene | Para-dimethylaminobenzaldehyde | Yellow. |
| 77 para-xylylene-dicyanide | do | Do. |
| 78 Indoxyl | Nitrosobenzene | Red. |
| 79 do | Para-hydroxynitrosobenzene | Brown. |
| 80 2:3-naphthio-indoxyl | Nitrosodimethylaniline | Violet. |
| 81 Cyanacetic acid ethyl ester | Para-aminobenzaldehyde | Yellow. |
| 82 do | 3-nitro-4-dimethylaminobenzaldehyde | Do. |
| 83 3-methyl-5-pyrazololone | Para-nitrosodimethylaniline | Do. |
| 84 Hydroxythionaphthene | Naphthalene-4-hydroxy-1-aldehyde | Brown-orange. |

The dyestuffs Nos. 1, 6, 14, 20, 26, 27, 29, 39, 41, 56, 57, 67, 70, and 73 have the following formulas:—

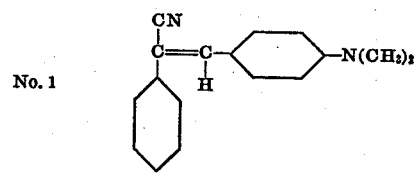

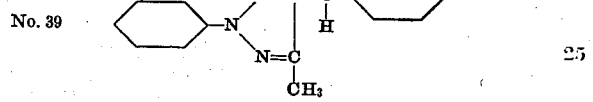

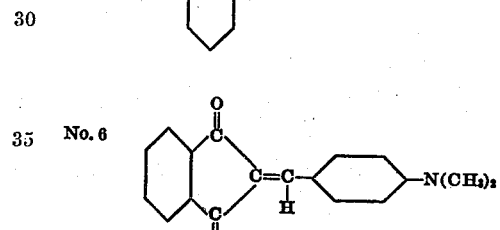

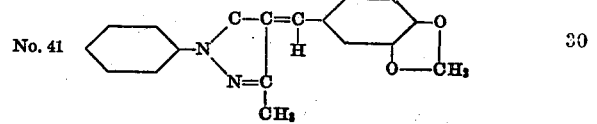

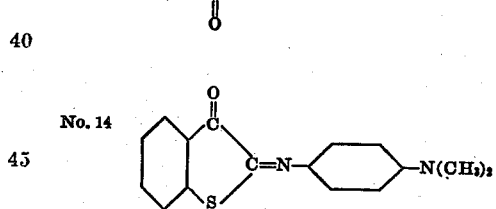

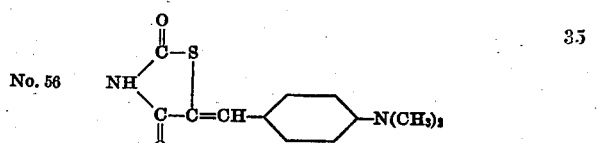

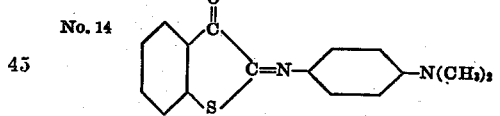

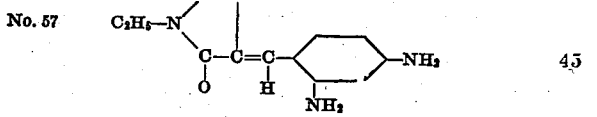

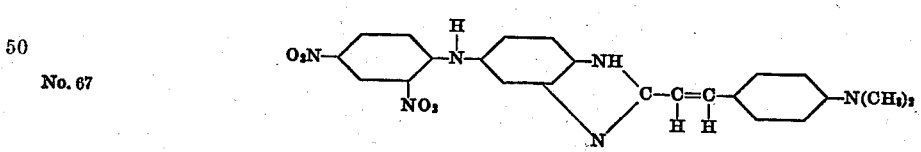

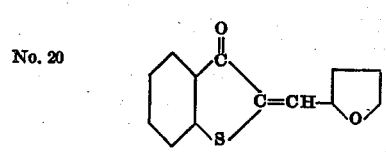

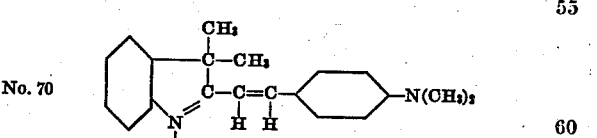

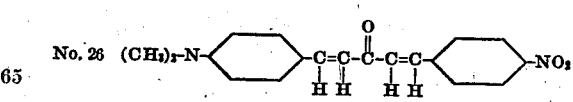

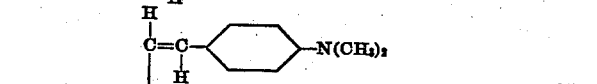

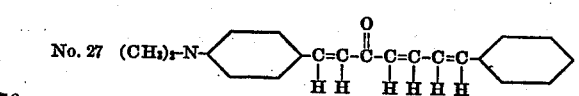

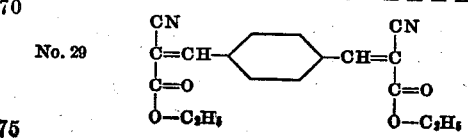

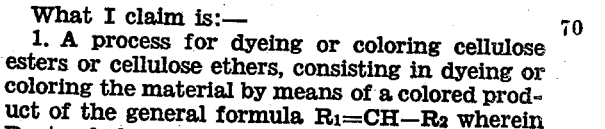

What I claim is:—

1. A process for dyeing or coloring cellulose esters or cellulose ethers, consisting in dyeing or coloring the material by means of a colored product of the general formula $R_1=CH-R_2$ wherein $R_1$ stands for any residue of a compound containing a heterocyclically bound reactive methylene group, and $R_2$ for any aryl residue.

2. A process for dyeing or coloring cellulose esters or cellulose ethers, consisting in dyeing or coloring the material by means of a colored product which can be obtained by condensing an aromatic aldehyde with compounds containing a heterocyclically bound reactive methylene group.

3. A process for dyeing or coloring cellulose esters or cellulose ethers, consisting in dyeing or coloring the material by means of a colored product which can be obtained by condensing an aromatic amino aldehyde with compounds containing a heterocyclically bound reactive methylene group.

4. A process for dyeing or coloring cellulose esters or cellulose ethers, consisting in dyeing or coloring the material by means of a colored product which can be obtained by condensing an aromatic para-dialkylamino-aldehyde with compounds containing a heterocyclically bound reactive methylene group.

5. A process for dyeing or coloring cellulose esters or cellulose ethers, consisting in dyeing or coloring the material by means of a colored product which can be obtained by condensing an aromatic para-dialkylamino-aldehyde whose alkyl groups contain not more than two carbon atoms each with compounds containing a heterocyclically bound reactive methylene group.

6. A process for dyeing or coloring cellulose esters or cellulose ethers, consisting in dyeing or coloring the material by means of a colored product which can be obtained by condensing a para-dialkylamino-benzaldehyde, whose alkyl groups contain not more than two carbon atoms each with compounds containing a heterocyclically bound reactive methylene group.

7. A process for dyeing or coloring cellulose esters or cellulose ethers, consisting in dyeing or coloring the material by means of a colored product which can be obtained by condensing a para-dialkylamino-benzaldehyde, whose alkyl groups contain not more than two carbon atoms each, with 1-phenyl-3-methyl-5-pyrazolone.

8. A process for dyeing or coloring cellulose esters or cellulose ethers, consisting in dyeing or coloring the material by means of a colored product which can be obtained by condensing a para-dialkylamino-benzaldehyde, whose alkyl groups contain not more than two carbon atoms each, with 1-(2'-chloro)-phenyl-3-methyl-5-pyrazolone.

FRANZ ACKERMANN.